No. 841,128. PATENTED JAN. 15, 1907.
C. A. DEWEY.
SEED CORN RACK AND GERMINATOR.
APPLICATION FILED SEPT. 7, 1906.
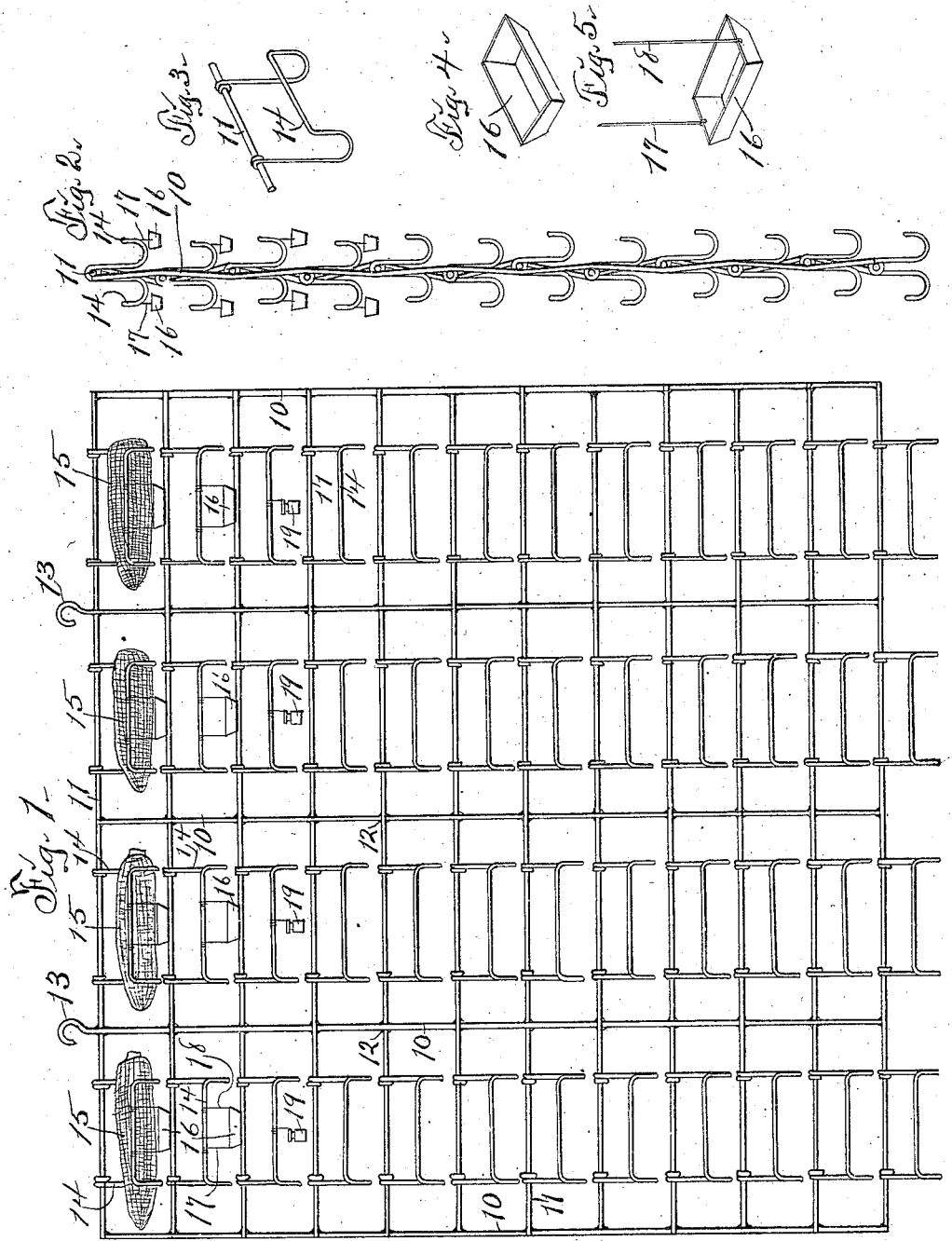

UNITED STATES PATENT OFFICE.

CHARLES A. DEWEY, OF ROCKWELL CITY, IOWA.

SEED-CORN RACK AND GERMINATOR.

No. 841,128.

Specification of Letters Patent.

Patented Jan. 15, 1907.

Application filed September 7, 1906. Serial No. 333,617.

*To all whom it may concern:*

Be it known that I, CHARLES A. DEWEY, a citizen of the United States of America, and a resident of Rockwell City, Calhoun county, Iowa, have invented a new and useful Seed-Corn Rack and Germinator, of which the following is a specification.

The object of this invention is to provide improved means for receiving, containing, and supporting seed-corn on the ear.

A further object of this invention is to provide improved means for germinating and testing seed-corn.

A further object of this invention is to provide means for containing and supporting seed-corn on the ear and means for germinating and testing said seed-corn contiguous thereto.

My invention consists in the construction, arrangement, and combination of elements hereinafter set forth, pointed out in my claims, and illustrated by the accompanying drawings, in which—

Figure 1 is a front elevation of the device, some of the germinating-receptacles omitted. Fig. 2 is an end elevation of the device. Fig. 3 is a detail perspective illustrating the construction and manner of supporting a hook for ear-corn. Fig. 4 is a perspective of a germinating-box adapted to be supported on the hook. Fig. 5 is a perspective of a germinating-box and means for supporting the same on the hook.

In the construction of the device as shown a supporting-frame is provided, which frame is made and constructed of vertical bars 10 and horizontal bars 11, crossing each other at right angles and spaced apart desired distances. The bars 10 11 may be of any desired material and be connected in any desired manner; but for convenience I show them made of wire interwoven and secured at the points of crossing by solder 12. The frame may be supported in any desired manner; but I prefer to supply hooks 13 on the top bar, adapted to engage a support, (not shown,) such as wire, rod, or beam. Double wire hooks 14 are mounted on the bars 11 between the bars 10 and depend therefrom. The hooks 14 may be secured by bending the extremities of the wires of which they are made around the horizontal bars 11 and may be arranged in pairs, as shown in Fig. 2, on opposite sides of the frame. Ears 15 of seed-corn may be laid in the hooks 14, one ear in each double hook, and in such position the several ears are exposed to thorough ventilation and may be so located and changed about as to be treated by direct rays of the sun as desired. By this means also the seed-corn is preserved and protected from rodents and earth moisture and maintained under desirable conditions in respect of curing. Boxes 16 are constructed from single pieces of sheet metal by cutting out the corners and bending the marginal portions at angles to the body, and wires 17 18 are fixed to the ends of said boxes and hooked or wrapped on the horizontal connecting-bars of the double hooks 14. Wide-mouthed bottles 19 or any equivalent device may be substituted for the boxes 16. The boxes 16 or other containers 19 may be mounted on the frame contiguous to the hooks 14, if desired; but when mounted in any way they serve as germinators.

In practical use the ear-corn is laid on the hooks 14 at any convenient time between harvest and planting. At a convenient time before planting the planter removes a few grains, four to six usually, from each ear and buries (plants) them in soil or water or moist sand or other germinating medium in a container 16 or 19, the grains from a given ear being planted in the container contiguous to said ear through the series. A few days later the planter inspects the containers 16 or 19 and makes his selection for permanent planting from the ears that furnished the seeds or grains that sprout therein, those ears that furnished the unsprouted seeds or grains being discarded in so far as field planting is concerned. A plurality of the frames and attachments may be employed, or a single frame may be used repeatedly in respect of one planting season with successive supplies of ear seed-corn.

I claim as my invention—

1. A rack or frame composed of horizontal bars and vertical bars crossing the horizontal bars and rigidly connected thereto, some of the vertical bars extending beyond the horizontal bars and provided with hooks on their ends and hooks mounted on and depending from opposite sides of said horizontal bars and arranged in vertical rows.

2. A rack or frame, hooks thereon adapted to support ear-corn, and containers mounted contiguous to said hooks.

3. A rack or frame, means for mounting seed-corn thereon, and germinators mounted on said frame adjacent the corn thereon.

4. A rack or frame, hooks thereon, and containers mounted on said hooks.

5. A rack or frame, hooks on both sides of said rack or frame, and containers on said hooks.

6. A rack or frame composed of horizontal bars and vertical bars crossing the horizontal bars and rigidly connected thereto, some of the vertical bars extending beyond the horizontal bars and provided with hooks on their ends, hooks mounted on and depending from opposite sides of said horizontal bars and arranged in vertical rows, and containers mounted on and depending from the latter hooks.

Signed by me at Des Moines, Iowa, this 26th day of February, 1906.

CHARLES A. DEWEY.

Witnesses:
L. L. LEIBROCK,
S. C. SWEET.